US012598578B2

(12) United States Patent
Xu et al.

(10) Patent No.: US 12,598,578 B2
(45) Date of Patent: Apr. 7, 2026

(54) METHOD AND APPARATUS FOR PERFORMING RANDOM ACCESS

(71) Applicant: Lenovo (Beijing) Limited, Beijing (CN)

(72) Inventors: Min Xu, Beijing (CN); Lianhai Wu, Beijing (CN); Jing Han, Beijing (CN); Haiming Wang, Beijing (CN); Ran Yue, Beijing (CN); Jie Shi, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 435 days.

(21) Appl. No.: 18/253,993

(22) PCT Filed: Nov. 24, 2020

(86) PCT No.: PCT/CN2020/131112
§ 371 (c)(1),
(2) Date: May 23, 2023

(87) PCT Pub. No.: WO2022/109777
PCT Pub. Date: Jun. 2, 2022

(65) Prior Publication Data
US 2024/0032105 A1     Jan. 25, 2024

(51) Int. Cl.
*H04W 74/0833*     (2024.01)
*H04W 64/00*     (2009.01)
(Continued)

(52) U.S. Cl.
CPC ....... *H04W 64/003* (2013.01); *H04W 74/006* (2013.01); *H04W 74/0833* (2013.01); *H04W 74/0836* (2024.01)

(58) Field of Classification Search
None
See application file for complete search history.

(56) References Cited

U.S. PATENT DOCUMENTS

2020/0260498 A1*   8/2020   Xu ................... H04W 74/0836
2021/0037426 A1*   2/2021   Zhu ....................... H04W 76/12
(Continued)

FOREIGN PATENT DOCUMENTS

CN        111278153  A      6/2020
CN        111526582  A      8/2020
(Continued)

OTHER PUBLICATIONS

Nokia , et al., "Discussion on 2-Step RACH adaptation in NTN", 3GPP TSG-RAN WG2 Meeting #112 Electronic, R2-2009981, Elbonia [retrieved May 10, 2023]. Retrieved from the Internet <https://www.3gpp.org/ftp/TSG_RAN/WG2_RL2/TSGR2_112-e/Docs/?sortby=sizerev>., Nov. 2020, 4 Pages.
(Continued)

*Primary Examiner* — Faiyazkhan Ghafoerkhan
(74) *Attorney, Agent, or Firm* — FIG. 1 Patents

(57)        ABSTRACT

The present application relates to a method and an apparatus for performing random access. The method includes: receiving a random access type condition message from a base station; and selectively performing a 2-step random access procedure or a 4-step random access procedure with the base station according to the random access type condition message.

20 Claims, 10 Drawing Sheets

Determining whether a distance is greater than a distance threshold to obtain a determination result

S503-3

(51) Int. Cl.
*H04W 74/00* (2009.01)
*H04W 74/0836* (2024.01)

(56) References Cited

U.S. PATENT DOCUMENTS

| | | | | |
|---|---|---|---|---|
| 2021/0037455 | A1* | 2/2021 | Zhu | H04W 76/27 |
| 2021/0037588 | A1* | 2/2021 | Zhu | H04W 48/18 |
| 2021/0105308 | A1* | 4/2021 | Bouazizi | H04L 65/1016 |
| 2021/0126698 | A1* | 4/2021 | Tsai | H04B 7/088 |
| 2021/0144769 | A1* | 5/2021 | Wei | H04W 72/23 |
| 2021/0266971 | A1* | 8/2021 | Turtinen | H04W 74/0833 |
| 2022/0046714 | A1* | 2/2022 | Zhou | H04L 5/0094 |
| 2022/0272624 | A1* | 8/2022 | Zhu | H04W 48/16 |
| 2023/0007699 | A1* | 1/2023 | Wei | H04W 24/08 |
| 2023/0030443 | A1* | 2/2023 | Chen | H04W 72/23 |
| 2023/0035046 | A1* | 2/2023 | You | H04W 36/13 |
| 2023/0049532 | A1* | 2/2023 | Qu | H04W 74/0833 |
| 2023/0060894 | A1* | 3/2023 | Rastegardoost | H04B 7/0695 |
| 2023/0092324 | A1* | 3/2023 | Seidel | H04W 74/0833 370/329 |
| 2023/0092926 | A1* | 3/2023 | Fu | H04W 74/0833 |
| 2023/0180301 | A1* | 6/2023 | Seidel | H04W 74/006 370/329 |
| 2023/0319935 | A1* | 10/2023 | Zhu | H04W 60/00 370/329 |
| 2024/0008050 | A1* | 1/2024 | Zhou | H04W 72/231 |
| 2024/0032105 | A1* | 1/2024 | Xu | H04W 74/006 |
| 2024/0389161 | A1* | 11/2024 | Zhou | H04L 1/1819 |

FOREIGN PATENT DOCUMENTS

| | | |
|---|---|---|
| CN | 111586707 A | 8/2020 |
| CN | 111818568 A | 10/2020 |
| EP | 4090121 A1 | 11/2022 |
| WO | 2020166047 A1 | 8/2020 |

OTHER PUBLICATIONS

PCT/CN2020/131112 , "International Preliminary Report on Patentability", PCT Application No. PCT/CN2020/131112, Jun. 8, 2023, 5 pages.

PCT/CN2020/131112 , "International Search Report and Written Opinion", PCT Application No. PCT/CN2020/131112, Aug. 23, 2021, 6 pages.

20962668.8 , "European Search Report", Application No. 20962668.8, Jul. 23, 2024, 11 pages.

* cited by examiner

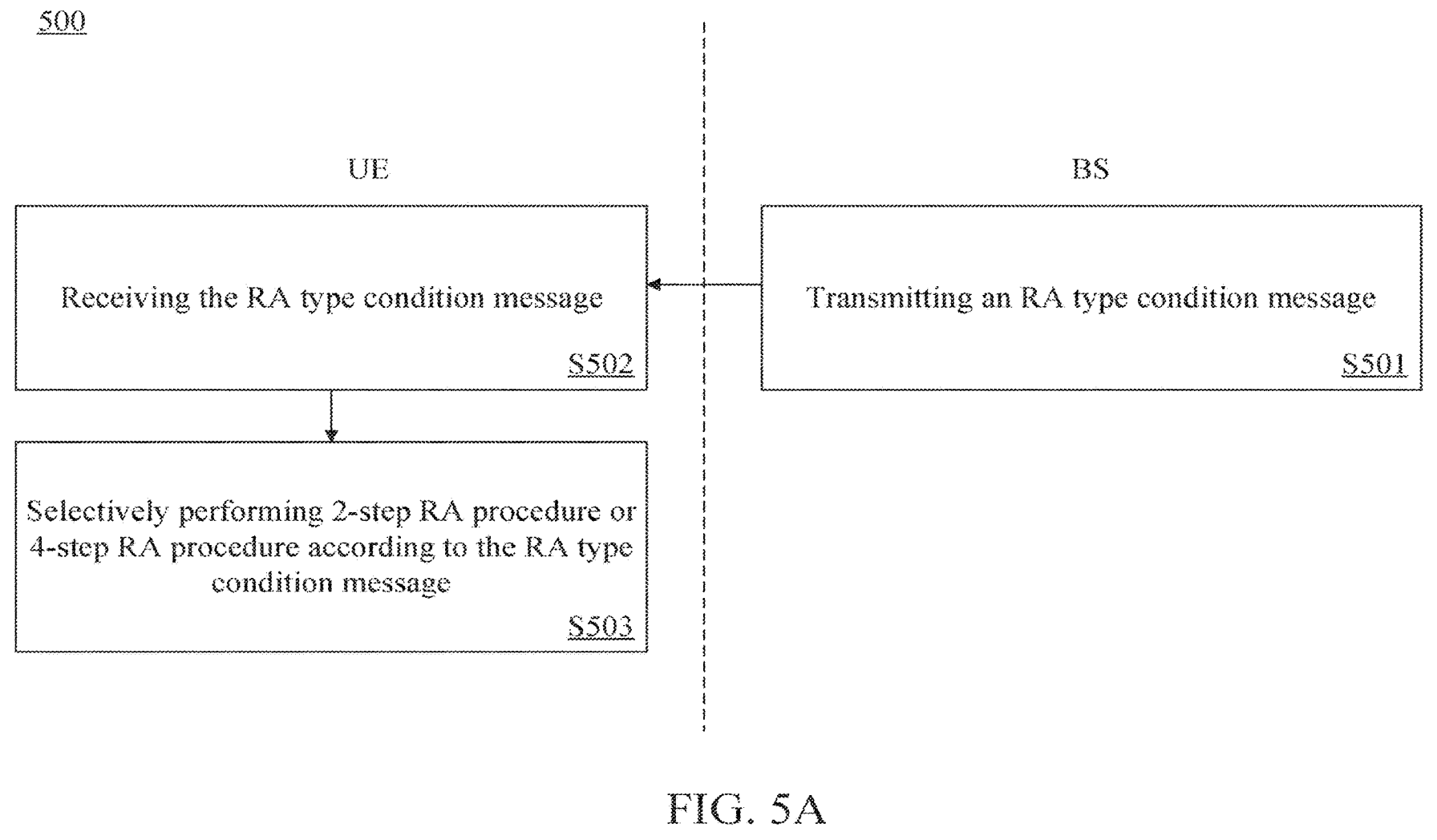

500

BS

Transmitting an RA type condition message    S501

UE

Receiving the RA type condition message    S502

Selectively performing 2-step RA procedure or 4-step RA procedure according to the RA type condition message    S503

FIG. 5A

Figures 5B, 5C, 5D:
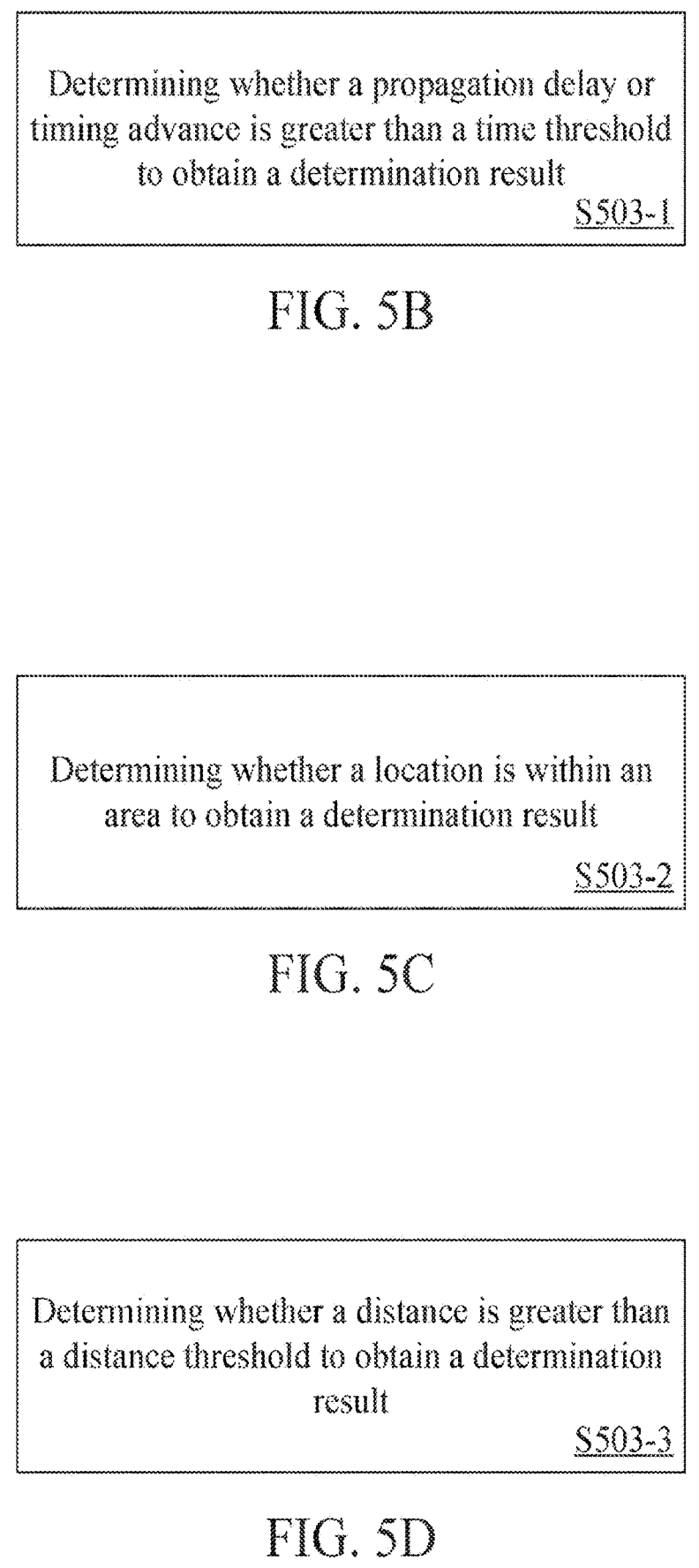

Determining whether a propagation delay or timing advance is greater than a time threshold to obtain a determination result

Determining whether a location is within an area to obtain a determination result

Determining whether a distance is greater than a distance threshold to obtain a determination result

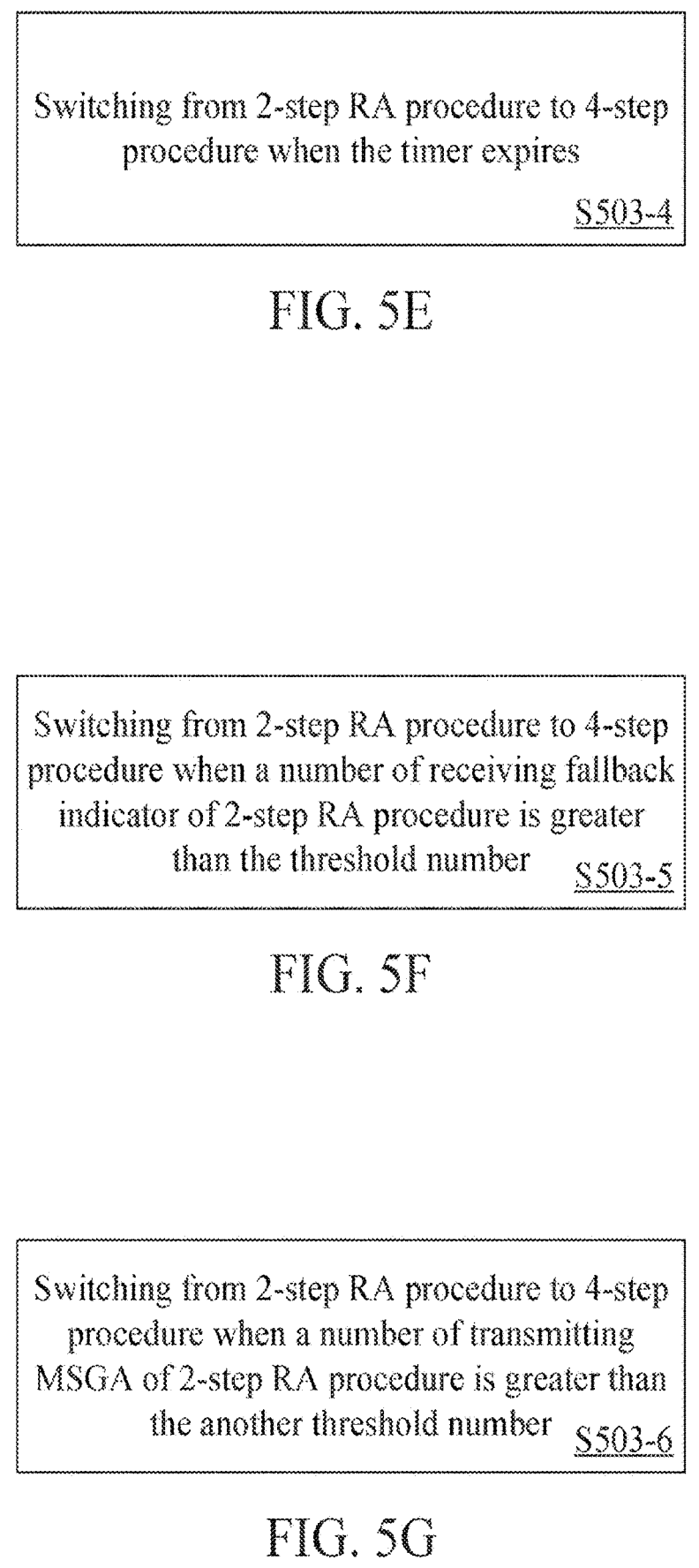

Switching from 2-step RA procedure to 4-step procedure when the timer expires

Switching from 2-step RA procedure to 4-step procedure when a number of receiving fallback indicator of 2-step RA procedure is greater than the threshold number          S503-5

FIG. 5F

Switching from 2-step RA procedure to 4-step procedure when a number of transmitting MSGA of 2-step RA procedure is greater than the another threshold number          S503-6

FIG. 5G

METHOD AND APPARATUS FOR PERFORMING RANDOM ACCESS

TECHNICAL FIELD

Embodiments of the present application generally relate to wireless communication technology, especially to a method and an apparatus for performing random access under 3 GPP (3rd Generation Partnership Project) 5G New Radio (NR).

BACKGROUND

In network of 3rd Generation Partnership Project (3GPP) 5G New Radio (NR), different types of random access (RA) procedures are supported. In some cases, the user equipment (UE) performs 4-step RA procedure with the base station (BS). In some cases, to reduce latency and control-signal overhead, the UE performs 2-step RA procedure with the BS.

For the UE to select the types of RA procedures to perform, reference signal received power (RSRP) threshold is introduced. For example, when the determined RSRP is not greater than the RSRP threshold, the UE performs 4-strep RA procedure with the BS. When the determined RSRP is greater than the RSRP threshold, the UE performs 2-strep RA procedure with the BS. However, in some networks, (e.g., non-terrestrial network), there are still some issues that need to be solved for selecting the RA procedure or switching from one RA procedure to another RA procedure.

SUMMARY

Some embodiments of the present application provide a method for a user equipment (UE). The method includes: receiving a random access type condition message from a base station (BS); and selectively performing a 2-step random access or a 4-step random access with the BS according to the random access type condition message.

Some embodiments of the present application provide a method for a BS. The method includes: transmitting a random access type condition message to a UE; and selectively performing a 2-step random access or a 4-step random access with the UE according to the random access type condition message Some embodiments of the present application provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communications.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIGS. 5A to 5G illustrate flow charts of a method for wireless communications according to an embodiment of the present disclosure.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), etc. It is contemplated that along with the 3GPP and related communication technology development, the terminologies recited in the present application may change, which should not affect the principle of the present application.

Figure 1:
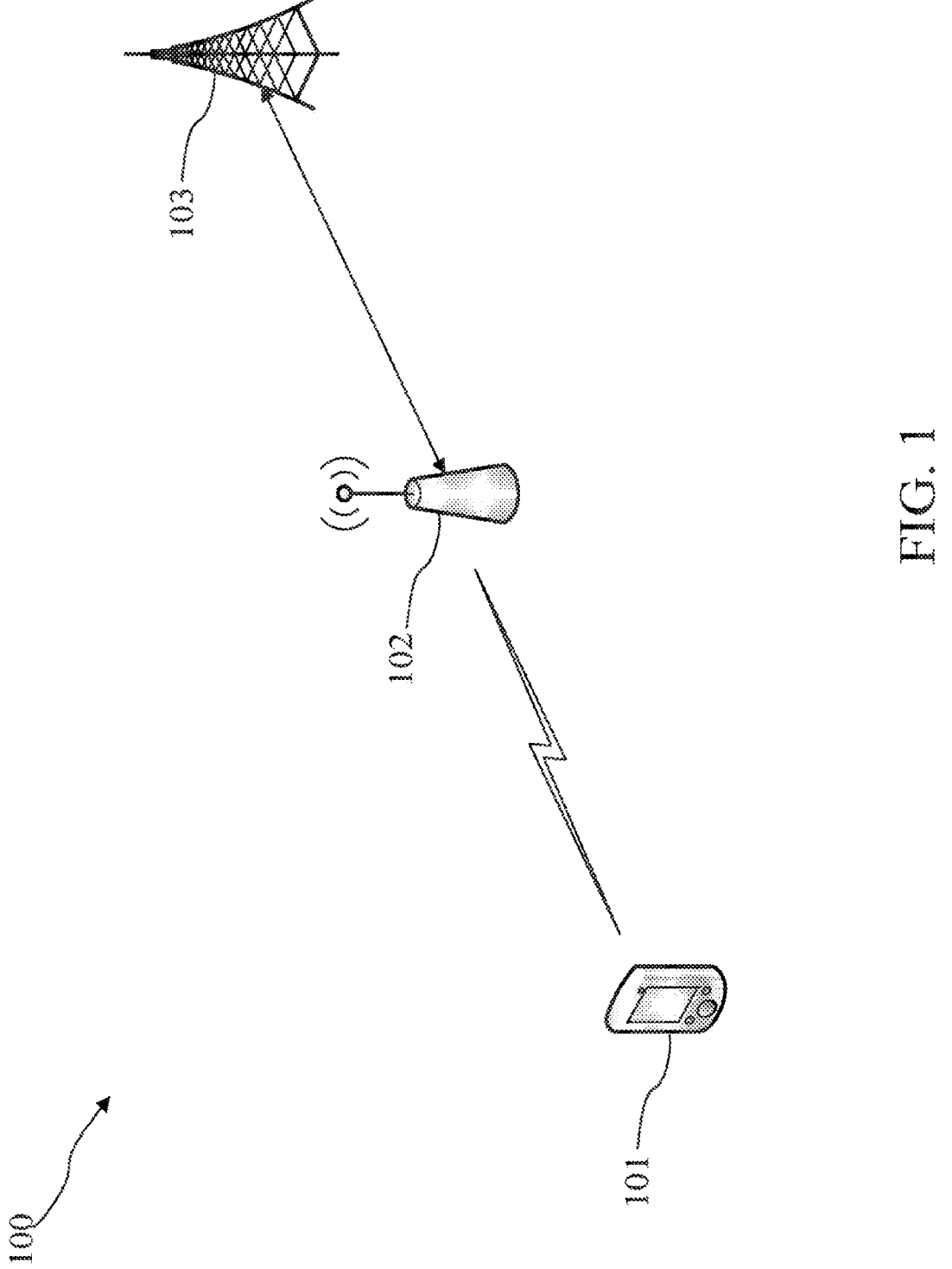
FIG. 1 illustrates a schematic diagram of a wireless communication system in accordance with some embodiments of the present application.

Referring to FIG. 1, a wireless communication system 100 may include a user equipment (UE) 101, a base station (BS) 102 and a core network (CN) 103. Although a specific number of the UE 101, the BS 102 and the CN 103 are depicted in FIG. 1, it is contemplated that any number of the UEs 101, the BSs 102 and the CNs 103 may be included in the wireless communication system 100.

The CN 103 may include a core Access and Mobility management Function (AMF) entity. The BS 102, which may communicate with the CN 103, may operate or work under the control of the AMF entity. The CN 103 may further include a User Plane Function (UPF) entity, which communicatively coupled with the AMF entity.

The BS 102 may be distributed over a geographic region. In certain embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s).

The UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, the UE 101 may include, for example, but is not limited to, a portable wireless communication device, a smart phone, a cellular telephone, a flip phone, a device having a subscriber identity module, a personal computer, a selective call receiver, a wireless sensor, a monitoring device, or any other device that is capable of sending and receiving communication signals on a wireless network.

In some embodiments of the present application, the UE 101 may include, for example, but is not limited to, wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate directly with the BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G New Radio (NR) of the 3GPP protocol or the NR-light of the 3GPP protocol, wherein the BS 102 transmits data using an OFDM modulation scheme on the downlink (DL) and the UE 101 transmits data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the UE 101 and BS 102 may communicate using other communication protocols, such as the IEEE 802.11 family of wireless communication protocols. Further, in some embodiments of the present application, the UE 101 and BS 102 may communicate over licensed spectrums, whereas in other embodiments, the UE 101 and BS 102 may communicate over unlicensed spectrums. The present application is not intended to be limited to the implementation of any particular wireless communication system architecture or protocol. In yet some embodiments of present application, the BS 102 may communicate with the UE 101 using the 3GPP 5G protocols.

In some networks, reference signal received powers (RSRPs) determined by the UEs within a network cell may be in smaller difference due to network properties. For example, in non-terrestrial network (NTN), the UEs 101 may be within the same network cell of the BS 102 (e.g., the satellite), and the RSRPs determined by the UEs 101 within the network cell may be in smaller difference. Accordingly, an appropriate RSRP threshold for selecting random access (RA) procedure (e.g., 2-step RA procedure or 4-step RA procedure) may not be defined easily. Therefore, using RSRP as the only criterion for selecting RA procedure may lead to load imbalance or even severe congestion/contention on one type of RA procedure.

Moreover, when the UE 101 performs 2-step RA procedure with the BS 102 and fails repeatedly, the UE 101 needs to obtain a certain number of failure feedbacks to switch to 4-step RA procedure. However, in some networks (e.g., non-terrestrial network) inherently having significant propagation delay of transmitting message, it may cause large access delay and more congestion/contention on 2-step RA resources.

Accordingly, in the present disclosure, additional conditions may be introduced for the UE 101 to: (1) select the RA procedure; and (2) determine to switch from one RA procedure to another RA procedure. More details on embodiments of the present disclosure will be further described hereinafter.

Figure 2:
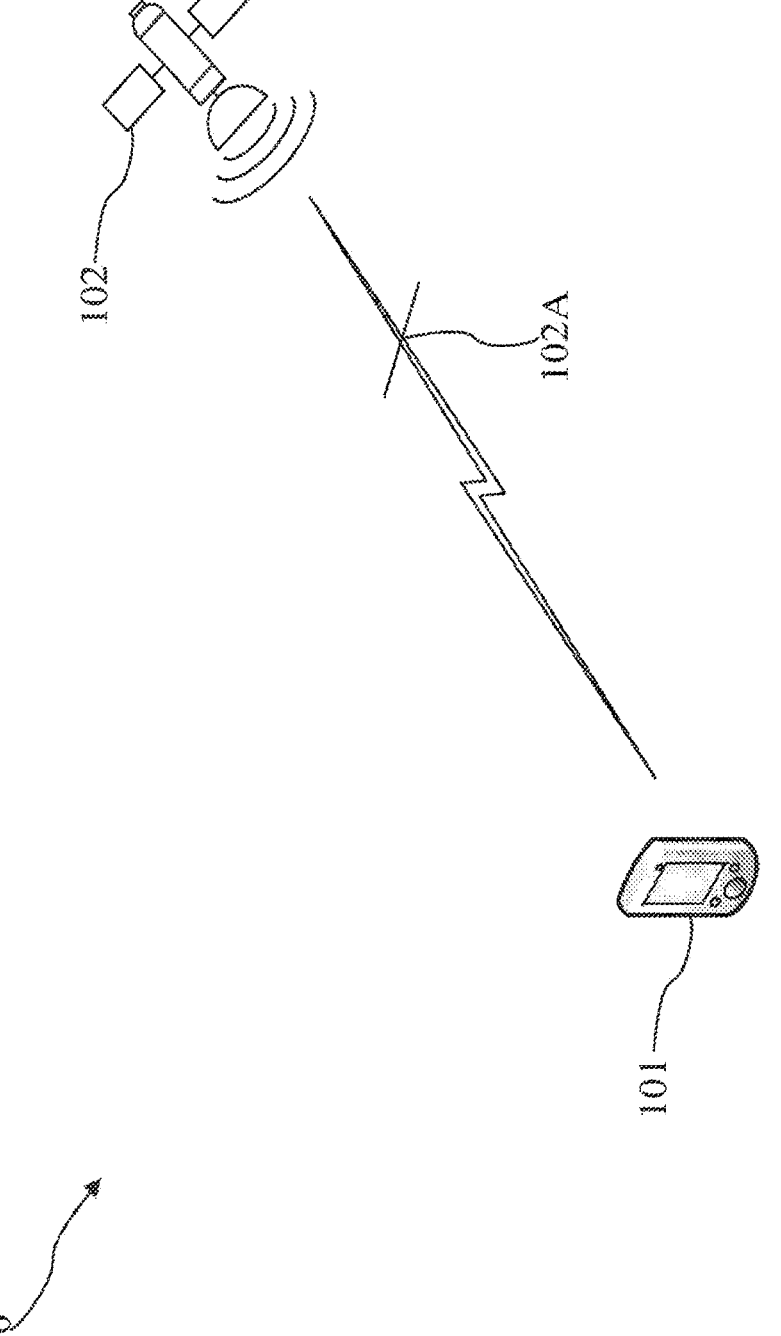
FIG. 2 illustrates a schematic diagram of message transmissions in accordance with some embodiments of the present application.

Please refer to FIG. 2, which is a schematic diagram of message transmissions between the UE 101 and the BS 102 (e.g., a satellite) in accordance with some embodiments of the present application. In some embodiments, the UE 101 may receive an RA type condition message 102A from the BS 102. Then, the BS 102 may selectively perform a 2-step RA procedure or a 4-step RA procedure with the BS 102 according to the RA type condition message. In some implementations, the RA type condition message 102A may be included in a system information block (SIB) or a radio resource control (RRC) signalling transmitted form the BS 102 to the UE 101.

In some embodiments, the RA type condition message 102A may include a network slice identification list. The network slice identification list may record first network slice identification(s) corresponding to 2-step RA procedure and second network slice identification(s) corresponding to 4-step RA procedure. The UE 101 may selectively perform 2-step RA procedure or 4-step RA procedure with the BS 102 according to the network slice identification(s) recorded on the network slice identification list. In some implementations, the network slice identification may include a single network slice selection assistance information (S-NSSAI).

In detail, different network slice identifications may respectively correspond to different network services. The network service having higher priority may require more stable RA procedure (e.g., 4-step RA procedure) between the UE 101 and the BS 102. Therefore, the BS 102 may determine that the first network slice identification(s) of the network service(s) having lower priority corresponds to 2-step RA procedure and the second network slice identification(s) having higher priority corresponds to 4-step RA procedure. Then, the BS 102 may record the correspondences on the network slice identification list.

Accordingly, after receiving the network slice identification list, the UE 101 may determine whether a requested network slice identification or a currently using network slice identification correspond to 2-step RA procedure or 4-step RA procedure according to the network slice identification list.

When the requested network slice identification or the currently using network slice identification corresponds to 2-step RA procedure, the UE 101 may perform 2-step RA procedure with the BS 102. When the requested network slice identification or the currently using network slice identification corresponds to 4-step RA procedure, the UE 101 may perform 4-step RA procedure with the BS 102.

For example, the network slice identification list records that the network slice identification 'N1' corresponds to 2-step RA procedure and the network slice identification 'N2' corresponds to 4-step RA procedure. The BS 102 transmits the network slice identification list to the UE 101. The UE 101 receives the network slice identification list from the BS 102.

When the requested network slice identification or the currently using network slice identification is 'N1", the UE 101 performs 2-step RA procedure with the BS 102 according the network slice identification list. When the requested network slice identification or the currently using network slice identification is 'N2", the UE 101 performs 4-step RA procedure with the BS 102 according the network slice identification list.

In some embodiments, the RA type condition message 102A may include a quality of service (QoS) indicator list. The QoS indicator list may record first QoS indicator(s) corresponding to 2-step RA procedure and at least one second QoS indicator(s) corresponding to 4-step RA procedure. The UE 101 may selectively perform 2-step RA procedure or 4-step RA procedure with the BS 102 according to the QoS indicator(s) recorded on the QoS indicator list. In some implementations, the QoS indicator may include a 5G QoS indicator (5QI).

In detail, different QoS indicators may respectively correspond to different network quality requirements. The stricter network quality requirement may require more stable RA procedure (e.g., 4-step RA procedure) between the UE 101 and the BS 102. Therefore, the BS 102 may determine that the first QoS indicator(s) with looser network quality requirement corresponds to 2-step RA procedure and the second QoS indicator(s) with stricter network quality requirement corresponds to 4-step RA procedure. Then, the BS 102 may record the correspondences on the QoS indicator list.

Accordingly, after receiving the QoS indicator list, the UE 101 may determine whether a QoS indicator indicated by the upper layer (e.g., Non-access stratum layer, NAS layer) or a currently using QoS indicator correspond to 2-step RA procedure or 4-step RA procedure according to the QoS indicator list.

When the QoS indicator indicated by the upper layer or the currently using QoS indicator corresponds to 2-step RA procedure, the UE 101 may perform 2-step RA procedure with the BS 102. When the QoS indicator indicated by the upper layer or the currently using QoS indicator corresponds to 4-step RA procedure, the UE 101 may perform 4-step RA procedure with the BS 102.

For example, the QoS indicator list records that the QoS indicator 'M1' corresponds to 2-step RA procedure and the QoS indicator 'M2' corresponds to 4-step RA procedure. The BS 102 transmits the QoS indicator list to the UE 101. The UE 101 receives the QoS indicator list from the BS 102.

When the QoS indicator indicated by the upper layer or the currently using QoS indicator is 'M1", the UE 101 performs 2-step RA procedure with the BS 102 according the QoS indicator list. When the QoS indicator indicated by the upper layer or the currently using QoS indicator is 'M2", the UE 101 performs 4-step RA procedure with the BS 102 according the QoS indicator list.

In some embodiments, the RA type condition message 102A may include a time threshold. The UE 101 may determine a propagation delay or a timing advance between the UE 101 and the BS 102. Then, the UE 101 may compare the propagation delay or the timing advance with the time threshold to obtain a determination result. The UE 101 may selectively perform 2-step RA procedure or 4-step RA procedure with the BS 102 according to the determination result.

In detail, when the propagation delay or the timing advance is large, a more stable RA procedure (e.g., 4-step RA procedure) between the UE 101 and the BS 102 may be required. Therefore, when the propagation delay or the timing advance is greater than the time threshold, the UE 101 may perform 4-step RA procedure. When the propagation delay or the timing advance is not greater than the time threshold, the UE 101 may perform 2-step RA procedure.

Figure 3A:
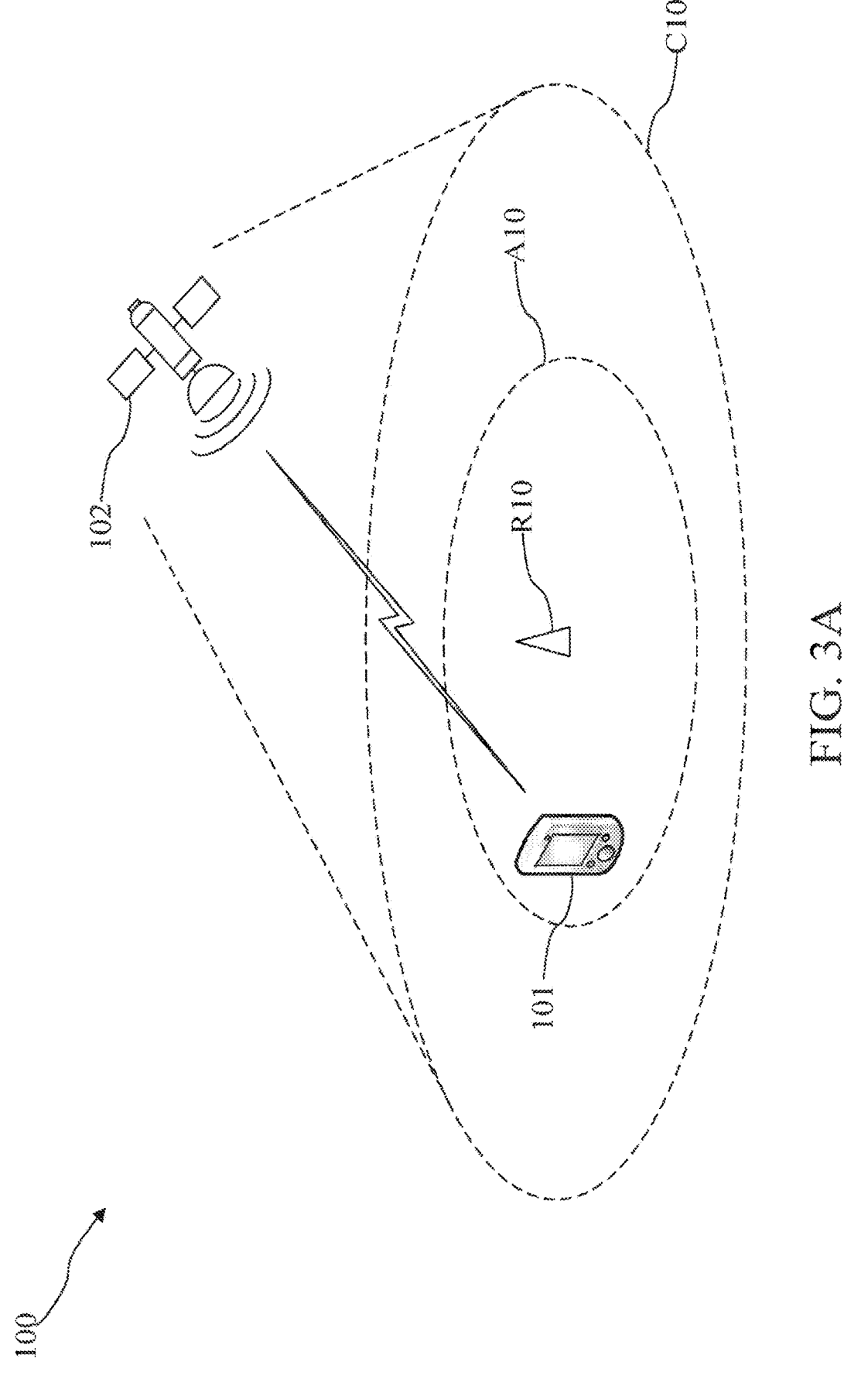
FIGS. 3A and 3B illustrate schematic diagrams of networks in accordance with some embodiments of the present application.
Figure 3B:
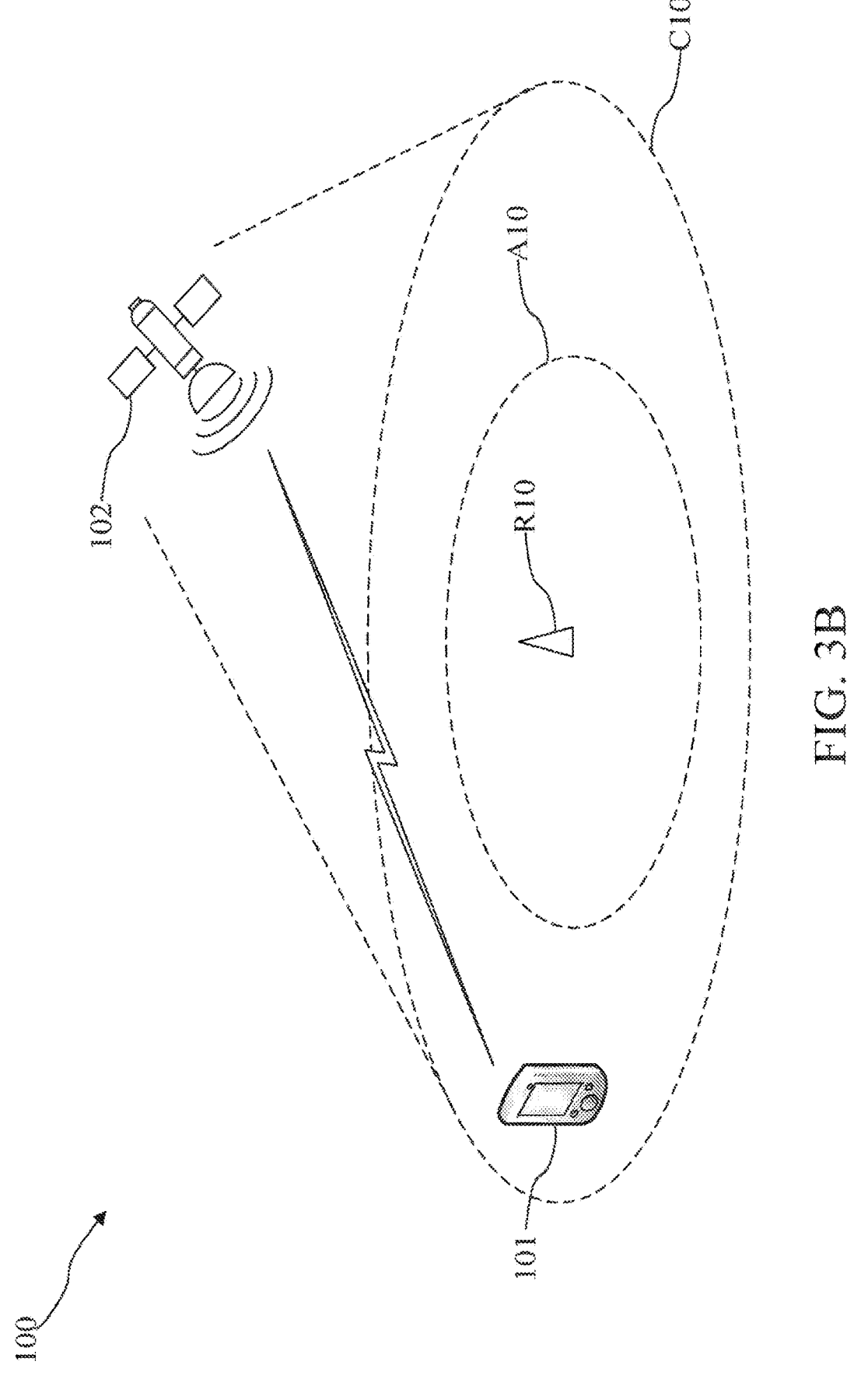

Please refer to FIGS. 3A and 3B, which are schematic diagrams of networks of the UE 101 and the BS 102 (e.g., a satellite) in accordance with some embodiments of the present application. In some embodiments, the RA type condition message 102A may include information of an area A10. The UE 101 may determine a location (e.g., coordinates) of the UE 101. Then, the UE 101 may determine whether the location of the UE 101 is within the area A10 to obtain a determination result. The UE 101 may selectively perform 2-step RA procedure or 4-step RA procedure with the BS 102 according to the determination result.

In detail, when the UE 101 is outside the area A10, the UE 101 may not be close to a reference point R10 of cell range C10 of the BS 102 and a more stable RA procedure (e.g., 4-step RA procedure) between the UE 101 and the BS 102 may be required. Therefore, as shown in FIG. 3A, when the UE 101 determines that the location of the UE 101 is within the area A10, the UE 101 may select 2-step RA procedure and perform 2-step RA procedure with the BS 102. As shown in FIG. 3B, when the UE 101 determines that the location of the UE 101 is not within the area A10, the UE 101 may select 4-step RA procedure and perform 4-step RA procedure with the BS 102.

In some implementations, the information of the area A10 may include coordinates of the reference point R10 of cell range C10 of the BS 102 and a radius. The area A10 may be defined as a circle area by the reference point R10 and the radius while the reference point R10 is the center of the circle area.

Figure 4A:
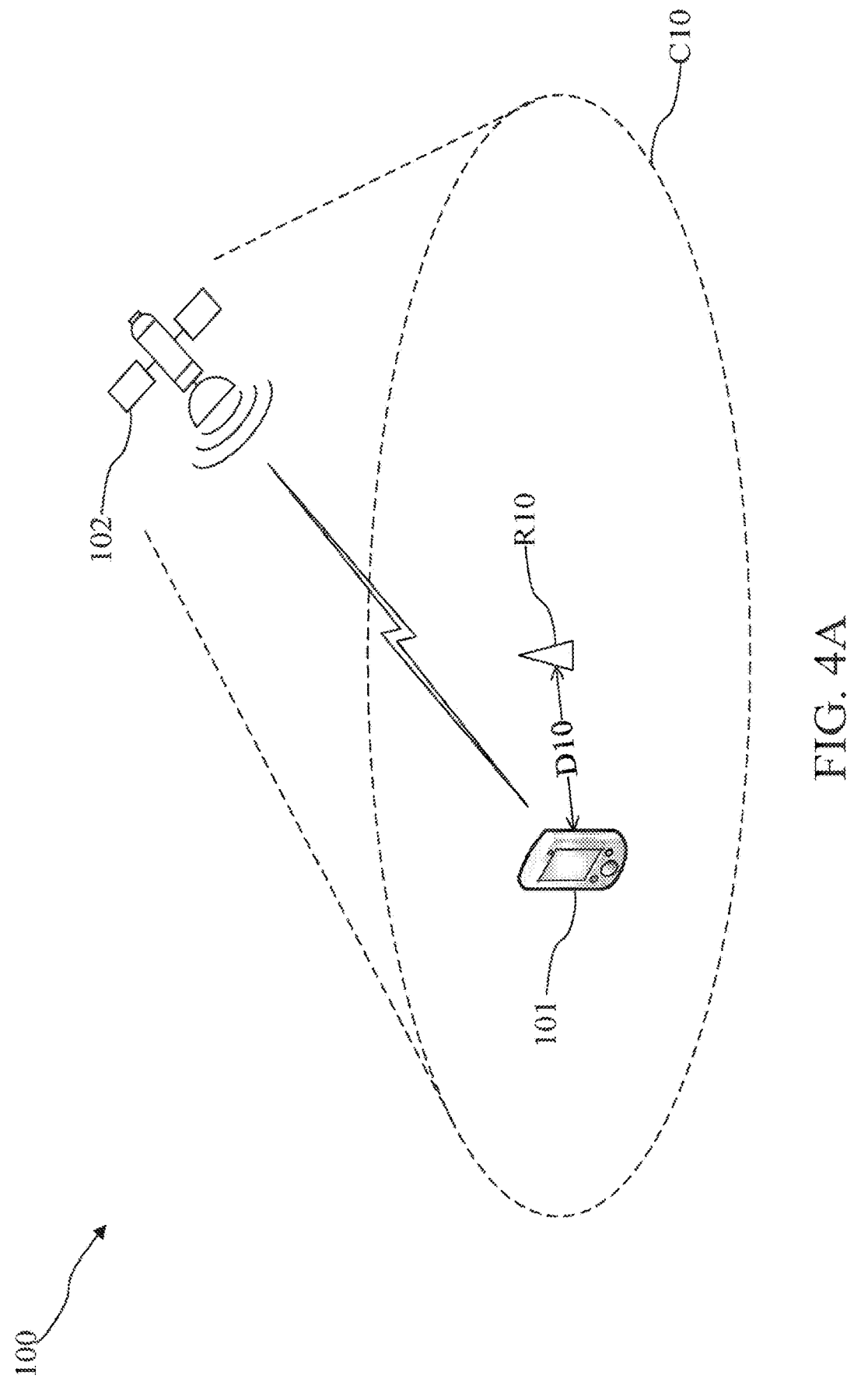
FIGS. 4A and 4B illustrate schematic diagrams of networks in accordance with some embodiments of the present application.
Figure 4B:
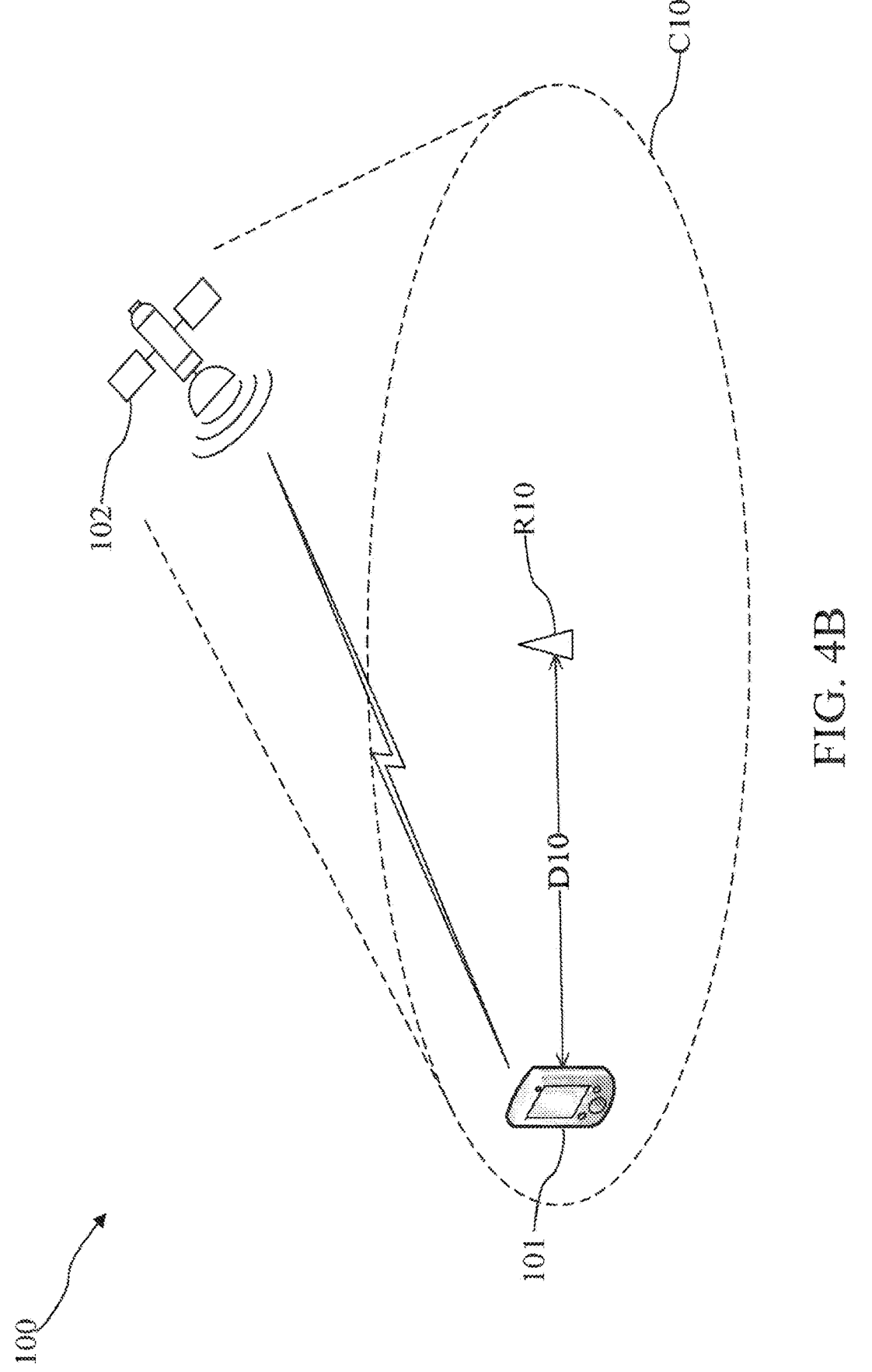

Please refer to FIGS. 4A and 4B, which are schematic diagrams of networks of the UE 101 and the BS 102 (e.g., a satellite) in accordance with some embodiments of the present application. In some embodiments, the RA type condition message 102A may include a distance threshold. The UE 101 may calculate a distance D10 between the UE 101 and the reference point R10 of cell range C10 of the BS 102. Then, the UE 101 may determine whether the distance D10 is greater than the distance threshold to obtain a determination result. The UE 101 may selectively perform 2-step RA procedure or 4-step RA procedure with the BS 102 according to the determination result.

In detail, when the distance D10 between the UE 101 and the reference point R10 is too long, a more stable RA procedure (e.g., 4-step RA procedure) between the UE 101 and the BS 102 may be required. Therefore, as shown in FIG. 4A, when the UE 101 determines that the distance D10 is not greater than the distance threshold, the UE 101 may select 2-step RA procedure and perform 2-step RA procedure with the BS 102. As shown in FIG. 4B, when the UE 101 determines that the distance D10 is greater than the distance threshold, the UE 101 may select 4-step RA procedure and perform 4-step RA procedure with the BS 102.

In some embodiments, the RA type condition message 102A may include the network slice identification list, the QoS indicator list, the time threshold, the information of an area, the distance threshold or any combination of the network slice identification list, the QoS indicator list, the time threshold, the information of an area and the distance threshold. The UE 101 may select 2-step RA procedure or 4-step RA procedure with a probability based on the fulfilment(s) of additional condition(s) (i.e., the network slice identification list, the QoS indicator list, the time threshold, the information of an area, the distance threshold or any combination thereof) included in the RA type condition message 102A.

In detail, the UE 101 may calculate a probability to select 4-step RA procedure instead of 2-step RA procedure and or a probability to select 2-step RA procedure instead of 4-step RA procedure according to a number of the fulfilled condition(s). Some embodiments of the conditions are provided below to facilitate the understanding to the present application. For example:

when the requested network slice identification or the currently using network slice identification corresponds to 2-step RA procedure based on the network slice identification list, the UE 101 counts such a condition as one first type condition;

when the requested network slice identification or the currently using network slice identification corresponds to 4-step RA procedure based on the network slice identification list, the UE 101 counts such a condition as one second type condition;

when the QoS indicator indicated by the upper layer or the currently using QoS indicator corresponds to 2-step RA procedure based on the QoS indicator list, the UE 101 counts such a condition as one first type condition;

when the QoS indicator indicated by the upper layer or the currently using QoS indicator corresponds to 4-step RA procedure based on the QoS indicator list, the UE 101 counts such a condition as one second type condition.

when the propagation delay or the timing advance is greater than the time threshold, the UE 101 counts such a condition as one first type condition;

when the propagation delay or the timing advance is not greater than the time threshold, the UE 101 counts such a condition as one second type condition;

when the UE 101 is within the area, the UE 101 counts such a condition as one first type condition;

when the UE 101 is not within the area, the UE 101 counts such a condition as one second type condition.

when the distance between the reference point and the UE 101 is not greater than the distance threshold, the UE 101 counts such a condition as one first type condition;

when the distance between the reference point and the UE 101 is greater than the distance threshold, the UE 101 counts such a condition as one second type condition.

According to the above, the UE 101 calculates: (1) a probability 'P10' for performing 2-step RA procedure based on the number of fulfilled first type conditions; and (2) a probability 'P20' for performing 4-step RA procedure based on the number of fulfilled second type conditions.

In some implementations, weights may be introduced for calculating the probability. For example, each additional condition may correspond to a predetermined weight, and the UE 101 calculates: (1) a probability 'P10' for performing 2-step RA procedure based on the number of fulfilled first type conditions and the weights correspond thereto; and (2) a probability 'P20' for performing 4-step RA procedure based on the number of fulfilled second type conditions and the weights correspond thereto.

It should be noted that the probability for performing the RA procedure means a possibility the UE 101 performs the RA procedure. For example, when the probability 'P10' is 80% and the 'probability 'P20' is 20%, it means that the UE 101 has 80% chance to perform 2-step RA procedure and 20% chance to perform 4-step RA procedure. In other words, generally, when there are ten UEs 101 in the network and these UE 101 respectively have the probability 'P10' of 80% and the 'probability 'P20' of 20%, about eight UEs 101 should perform 2-step RA procedure and about two UEs 101 should perform 4-step RA procedure.

In some embodiments, RSRP threshold may still be introduced for the UE 101 to select the RA procedure. In detail, the UE 101 may selectively perform 2-step RA procedure or 4-step RA procedure according to criterions of: (1) any combination of the network slice identification list, the QoS indicator list, the time threshold, the information of an area and the distance threshold which are recorded in the RA type condition message 102A; and (2) the RSRP threshold.

In some embodiments, the RA type condition message 102A may include a timer for the UE 101 to determine to switch from one RA procedure to another RA procedure. In detail, the UE 101 may try to perform one RA procedure with the BS 102 and fails repeatedly. Then, the UE 101 may switch from one RA procedure to another RA procedure when the timer expires. For example, the UE 101 tries to perform 2-step RA procedure with the BS 102 and fails repeatedly. Then, the UE 101 switches from 2-step RA procedure to 4-step RA procedure when the timer expires.

In some embodiments, the RA type condition message 102A may include a threshold number for the UE 101 to determine to switch from one RA procedure to another RA procedure. In detail, the UE 101 may try to perform one RA procedure with the BS 102 and fails repeatedly. Every time the RA procedure fails, the UE 101 may receive a fallback indicator from the BS 102. Then, the UE 101 may count a number of receiving the fallback indicator. The UE 101 may switch from one RA procedure to another RA procedure when the number of receiving the fallback indicator is greater than the threshold number.

For example, the UE 101 tries to perform 2-step RA procedure with the BS 102 and fails repeatedly. The UE 101 counts a number of receiving the fallback indicator (i.e., the fallback indicator in MSGB). Then, the UE 101 switches from 2-step RA procedure to 4-step RA procedure when the number of receiving the fallback indicator is greater than the threshold number.

In some embodiments, the RA type condition message 102A may include another threshold number for the UE 101 to determine to switch from one RA procedure to another RA procedure. In detail, the UE 101 may try to perform one RA procedure with the BS. When the UE 101 tries to perform the RA procedure with the BS 102 without success, the UE 101 may keep transmitting RA initial message. Then, the UE 101 may count a number of transmitting the RA initial message. The UE 101 may switch from one RA procedure to another RA procedure when the number of transmitting the RA initial message is greater than the another threshold number.

For example, when the UE 101 tries to perform 2-step RA procedure with the BS 102, the UE 101 transmits an initial message (i.e., MSGA) to the BS 102. The UE 101 counts a number of transmitting the RA initial message. Then, the UE 101 switches from 2-step RA procedure to 4-step RA procedure when the number of transmitting the RA initial message is greater than the another threshold number.

In some embodiments, the RA type condition message 102A may include the timer, the threshold number for receiving the fallback indicator, the another threshold number for transmitting the RA initial message or any combination of the timer and the threshold numbers. The UE 101 may switch from one RA procedure to another RA procedure with a probability based on the fulfilment(s) associated with the additional condition(s) included in the RA type condition message 102A.

In detail, the UE 101 may calculate a probability to switch from 2-step RA procedure to 4-step RA procedure according to a number of the fulfilled condition(s). Some embodiments of the conditions are provided below to facilitate the understanding to the present application. For example:

when the timer expires, the UE 101 counts such a condition as one third type condition;

when the number of receiving the fallback indicator is greater than the threshold number, the UE 101 counts such a condition as one third type condition;

when the number of transmitting the RA initial message is greater than the another threshold number, the UE 101 counts such a condition as one third type condition.

According to the above, the UE 101 calculates the probability 'P30' for switching from 2-step RA procedure based on the number of fulfilled third type conditions.

In some implementations, weights may be introduced for calculating the probability. For example, each additional condition may correspond to a predetermined weight, and the UE 101 calculates: (1) a probability 'P30' for switching from 2-step RA procedure to 4-step RA procedure based on the number of fulfilled third type conditions and the weights correspond thereto.

It should be noted that the probability for switching from one RA procedure to another RA procedure means a possibility the UE 101 switches between the RA procedures. For example, when the probability 'P30' is 80%, it means that the UE 101 has 80% chance to switch from 2-step RA procedure to 4-step RA procedure. In other words, generally, when there are ten UEs 101 in the network and these UE 101 respectively have the probability 'P30' of 80%, about eight UEs 101 should switch from 2-step RA procedure to 4-step RA procedure.

In some embodiments, a condition timer may be introduced for the UE 101 and the BS 102 to determine validation of the additional conditions. In detail, the BS 102 may configure the condition timer and transmit the condition timer with the RA type condition message 102A to the UE 101. For the UE 101 and the BS 102: (1) when the condition timer does not expire, the additional conditions (e.g., network slice identification list, QoS indicator list, time threshold, information of area, distance threshold, timer and threshold numbers) may be available; and (2) when the condition timer expires, the additional conditions may be unavailable.

FIGS. 5A to 5G illustrate flow charts of a method for wireless communications in accordance with some embodiments of the present application. Referring to FIG. 5A, method 500 is performed by a UE and a BS (e.g., the UE 101 and the BS 102) in some embodiments of the present application.

In some embodiments, operation S501 is executed to transmit, by the BS, an RA type condition message to the UE. Operation S502 is executed to receive, by the UE, the RA type condition message from the BS. Operation S503 is executed to selectively perform, by the UE, a 2-step RA procedure or a 4-step RA procedure with the BS according to the RA type condition message.

In some implementations, the RA type condition message may include a network slice identification list. The network slice identification list may record network slice identification(s) corresponding to 2-step RA procedure and/or 4-step RA procedure. In operation S503, the UE may selectively perform 2-step RA procedure or 4-step RA procedure with the BS 102 according to the network slice identification(s) recorded on the network slice identification list.

In detail, according to the network slice identification(s) recorded on the network slice identification list: (1) when a requested network slice identification or a currently using network slice identification corresponds to 2-step RA procedure, the UE 101 may perform 2-step RA procedure with the BS 102; (2) when the requested network slice identification or the currently using network slice identification corresponds to 4-step RA procedure, the UE may perform 4-step RA procedure with the BS.

In some implementations, the RA type condition message may include a QoS indicator list. The QoS indicator list may record QoS indicator(s) corresponding to 2-step RA procedure and/or 4-step RA procedure. In operation S503, the UE may selectively perform 2-step RA procedure or 4-step RA procedure with the BS 102 according to the QoS indicator(s) recorded on the QoS indicator list.

In detail, according to the QoS indicator(s) recorded on the QoS indicator list: (1) when the QoS indicator indicated by an upper layer or a currently using QoS indicator corresponds to 2-step RA procedure, the UE may perform 2-step RA procedure with the BS; (2) when the QoS indicator indicated by the upper layer or the currently using QoS indicator corresponds to 4-step RA procedure, the UE may perform 4-step RA procedure with the BS.

In some implementations, the RA type condition message may include a time threshold. The method 500 may further include operation S503-1. In detail, before operation S503, operation S503-1 is executed to determine, by the UE, whether a propagation delay or timing advance between the UE and the BS is greater than the time threshold to obtain a determination result. In operation S503, the UE may selectively perform 2-step RA procedure or 4-step RA procedure with the BS according to the determination result.

In detail, when the propagation delay or the timing advance is greater than the time threshold, the UE may perform 4-step RA procedure. When the propagation delay or the timing advance is not greater than the time threshold, the UE may perform 2-step RA procedure.

In some implementations, the RA type condition message may include information of an area. The method 500 may further include operation S503-2. In detail, before operation S503, operation S503-2 is executed to determine, by the UE, whether a location of the UE is within the area to obtain a determination result. In operation S503, the UE may selectively perform 2-step RA procedure or 4-step RA procedure with the BS according to the determination result.

In detail, when the UE determines that the location of the UE is within the area, the UE 101 may select 2-step RA procedure and perform 2-step RA procedure with the BS. When the UE determines that the location of the UE is not within the area, the UE may select 4-step RA procedure and perform 4-step RA procedure with the BS.

In some implementations, the RA type condition message may include a distance threshold. The method 500 may further include operation S503-3. In detail, before operation S503, operation S503-3 is executed to determine, by the UE, whether a distance between the UE and a reference point is greater than the distance threshold to obtain a determination result. In operation S503, the UE may selectively perform 2-step RA procedure or 4-step RA procedure with the BS according to the determination result.

In detail, when the UE determines that the distance is not greater than the distance threshold, the UE may select 2-step RA procedure and perform 2-step RA procedure with the BS. When the UE determines that the distance is greater than the distance threshold, the UE may select 4-step RA procedure and perform 4-step RA procedure with the BS.

In some implementations, the RA type condition message may include a timer for the UE to determine to switch from 2-step RA procedure to 4-step RA procedure. The method 500 may further include operation S503-4. In detail, before operation S503, operation S503-4 is executed to switch, by the UE, from the 2-step RA procedure to the 4-step RA procedure when the timer expires. In operation S503, the UE may perform 4-step RA procedure with the BS.

In some implementations, the RA type condition message may include a threshold number for the UE to determine to switch from 2-step RA procedure to 4-step RA procedure. The method 500 may further include operation S503-5. In detail, before operation S503, operation S503-5 is executed to switch, by the UE, from 2-step RA procedure to the 4-step RA procedure when a number of receiving fallback indicator of 2-step RA procedure is greater than the threshold number. In operation S503, the UE may perform 4-step RA procedure with the BS.

In some implementations, the RA type condition message may include another threshold number for the UE to determine to switch from 2-step RA procedure to 4-step RA procedure. The method 500 may further include operation S503-6. In detail, before operation S503, operation S503-6 is executed to switch, by the UE, from 2-step RA procedure to the 4-step RA procedure when a number of transmitting MSGA of 2-step RA procedure is greater than the another threshold number. In operation S503, the UE may perform 4-step RA procedure with the BS.

Figure 6:
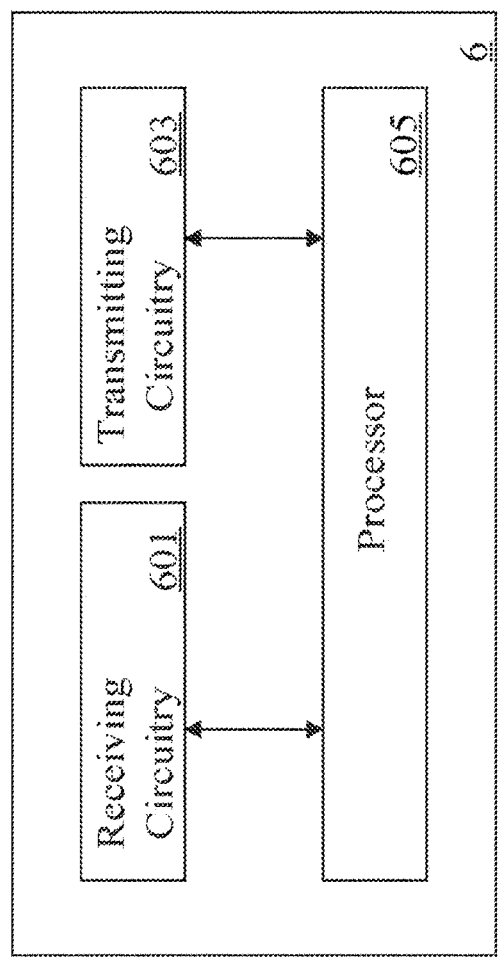
FIG. 6 illustrates a block diagram of an exemplary apparatus in accordance with some embodiments of the present application.

FIG. 6 illustrates an example block diagram of an apparatus 6 according to an embodiment of the present disclosure.

As shown in FIG. 6, the apparatus 6 may include at least one non-transitory computer-readable medium (not illustrated in FIG. 6), a receiving circuitry 601, a transmitting circuitry 603, and a processor 605 coupled to the non-transitory computer-readable medium (not illustrated in FIG. 6), the receiving circuitry 601 and the transmitting circuitry 603. The apparatus 6 may be a UE or a BS.

Although in this figure, elements such as processor 605, transmitting circuitry 603, and receiving circuitry 601 are described in the singular, the plural is contemplated unless limitation to the singular is explicitly stated. In some embodiments of the present disclosure, the receiving circuitry 601 and the transmitting circuitry 603 are combined into a single device, such as a transceiver. In certain embodiments of the present disclosure, the apparatus 6 may further include an input device, a memory, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 605 interacting with receiving circuitry 601 and transmitting circuitry 603, so as to perform the operations with respect to UE and BS depicted in FIG. 2.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a user equipment (UE), the method comprising:

receiving a random access type condition message that includes a time threshold from a base station (BS);

determining whether a propagation delay or a timing advance between the UE and the BS is greater than the time threshold to obtain a determination result; and selectively performing a 2-step random access procedure or a 4-step random access procedure with the BS according to the determination result, wherein selectively performing the 2-step random access procedure or the 4-step random access procedure comprises:

performing the 2-step random access procedure if the propagation delay or the timing advance is not greater than the time threshold; or performing the 4-step random access procedure if the propagation delay or the timing advance is greater than the time threshold.

2. The method of claim 1, wherein the random access type condition message includes at least one network slice identification, and the selectively performing the 2-step random access procedure or the 4-step random access procedure with the BS is according to the at least one network slice identification.

3. The method of claim 1, wherein the random access type condition message includes at least one quality of service indicator, and the selectively performing the 2-step random access procedure or the 4-step random access procedure with the BS is according to the at least one quality of service indicator.

4. The method of claim 1, wherein the random access type condition message includes information of an area, and the method further comprises:

determining whether a location of the UE is within the area; and selecting the 2-step random access procedure if the location of the UE is within the area; or selecting the 4-step random access procedure if the location of the UE is not within the area.

5. The method of claim 1, wherein the random access type condition message includes a distance threshold, and the method further comprises:

determining whether a distance between the UE and a reference point is greater than the distance threshold; and selecting the 2-step random access procedure if the distance between the UE and the reference point is not greater than the distance threshold; or selecting the 4-step random access procedure if the distance between the UE and the reference point is greater than the distance threshold.

6. The method of claim 1, wherein the random access type condition message includes a timer, and the method further comprises:

switching from the 2-step random access procedure to the 4-step random access procedure when the timer expires; and performing the 4-step random access procedure with the BS.

7. The method of claim 1, wherein the random access type condition message includes a threshold number, and the method further comprises:

switching from the 2-step random access procedure to the 4-step random access procedure if a first number of receiving fallback indicators of the 2-step random access procedure is greater than the threshold number or if a second number of transmitting message A of the 2-step random access procedure is greater than the threshold number; and performing the 4-step random access procedure with the BS.

8. A base station (BS) for wireless communication, comprising:

at least one memory; and at least one processor coupled with the at least one memory and configured to cause the BS to:

transmit a random access type condition message that includes a time threshold to a user equipment (UE);

determine whether a propagation delay or a timing advance between the UE and the BS is greater than the time threshold to obtain a determination result; and selectively perform a 2-step random access procedure or a 4-step random access procedure with the UE according to the determination result, wherein, to selectively perform the 2-step random access procedure or the 4-step random access procedure, the at least one processor is configured to cause the BS to:

perform the 2-step random access procedure if the propagation delay or the timing advance is not greater than the time threshold; or perform the 4-step random access procedure if the propagation delay or the timing advance is greater than the time threshold.

9. The BS of claim 8, wherein the random access type condition message includes at least one of network slice identification, a quality of service indicator, information of an area, or a distance threshold.

10. The BS of claim 8, wherein the random access type condition message includes a timer or a threshold number for the UE to switch between the 2-step random access procedure and the 4-step random access procedure.

11. A user equipment (UE) for wireless communication, comprising:

at least one memory; and at least one processor coupled with the at least one memory and configured to cause the UE to:

receive a random access type condition message that includes a time threshold from a base station (BS);

determine whether a propagation delay or a timing advance between the UE and the BS is greater than the time threshold to obtain a determination result; and selectively perform a 2-step random access procedure or a 4-step random access procedure with the BS according to the determination result, wherein, to selectively perform the 2-step random access procedure or the 4-step random access procedure, the at least one processor is configured to cause the UE to:

perform the 2-step random access procedure if the propagation delay or the timing advance is not greater than the time threshold; or perform the 4-step random access procedure if the propagation delay or the timing advance is greater than the time threshold.

12. The UE of claim 11, wherein the random access type condition message includes at least one network slice identification, and the 2-step random access procedure or the 4-step random access procedure selectively performed with the BS is according to the at least one network slice identification.

13. The UE of claim 11, wherein the random access type condition message includes at least one quality of service indicator, and the 2-step random access procedure or the 4-step random access procedure selectively performed with the BS is according to the at least one quality of service indicator.

14. The UE of claim 11, wherein the random access type condition message includes information of an area, and the at least one processor is further configured to cause the UE to:

determine whether a location of the UE is within the area; and select the 2-step random access procedure if the location of the UE is within the area; or select the 4-step random access procedure if the location of the UE is not within the area.

15. The UE of claim 11, wherein the random access type condition message includes a distance threshold, and the at least one processor is further configured to cause the UE to:

determine whether a distance between the UE and a reference point is greater than the distance threshold; and select the 2-step random access procedure if the distance between the UE and the reference point is not greater than the distance threshold; or select the 4-step random access procedure if the distance between the UE and the reference point is greater than the distance threshold.

16. The UE of claim 11, wherein the random access type condition message includes a timer, and the at least one processor is further configured to cause the UE to:

switch from the 2-step random access procedure to the 4-step random access procedure when the timer expires; and perform the 4-step random access procedure with the BS.

17. The UE of claim 11, wherein the random access type condition message includes a threshold number, and the at least one processor is further configured to cause the UE to:

switch from the 2-step random access procedure to the 4-step random access procedure if a first number of receiving fallback indicators of the 2-step random access procedure is greater than the threshold number or if a second number of transmitting message A of the 2-step random access procedure is greater than the threshold number; and performing the 4-step random access procedure with the BS.

18. A method performed by a base station (BS), the method comprising:

transmitting a random access type condition message that includes a time threshold to a user equipment (UE);

determining whether a propagation delay or a timing advance between the UE and the BS is greater than the time threshold to obtain a determination result; and selectively performing a 2-step random access procedure or a 4-step random access procedure with the UE according to the determination result, wherein selectively performing the 2-step random access procedure or the 4-step random access procedure comprises:

performing the 2-step random access procedure if the propagation delay or the timing advance is not greater than the time threshold; or performing the 4-step random access procedure if the propagation delay or the timing advance is greater than the time threshold.

19. The method of claim 18, wherein the random access type condition message includes at least one of network slice identification, a quality of service indicator, information of an area, or a distance threshold.

20. The method of claim 18, wherein the random access type condition message includes a timer or a threshold number for the UE to switch between the 2-step random access procedure and the 4-step random access procedure.

* * * * *